United States Patent
Bauer

[15] 3,685,365
[45] Aug. 22, 1972

[54] VARIABLE SPEED PISTON-SWIVEL COMBINATION
[72] Inventor: James J. Bauer, Lisbon, N. Dak.
[73] Assignee: Clark Equipment Company
[22] Filed: June 29, 1970
[21] Appl. No.: 50,615

[52] U.S. Cl. ..........................................74/230.17 F
[51] Int. Cl. ..............................................F16h 55/52
[58] Field of Search ............................74/230.17 FT

[56] References Cited

UNITED STATES PATENTS

| 3,526,150 | 9/1970 | Iverson | 74/230.17 F |
| 2,779,203 | 1/1957 | Eubanks | 74/230.17 F |

FOREIGN PATENTS OR APPLICATIONS

| 604,937 | 9/1960 | Canada | 74/230.17 FT |

Primary Examiner—C. J. Husar
Attorney—Kenneth C. Witt, John C. Wiessler, Robert H. Johnson and Reginald J. Falkowski

[57] ABSTRACT

A variable sheave and swivel joint combination including first and second sheave members and a piston slidably disposed in a tubular portion of the first sheave member. The piston is connected to the second sheave by a piston rod which includes a bore in which the swivel joint is substantially entirely disposed.

6 Claims, 2 Drawing Figures

PATENTED AUG 22 1972   3,685,365
FIG. 1
FIG. 2
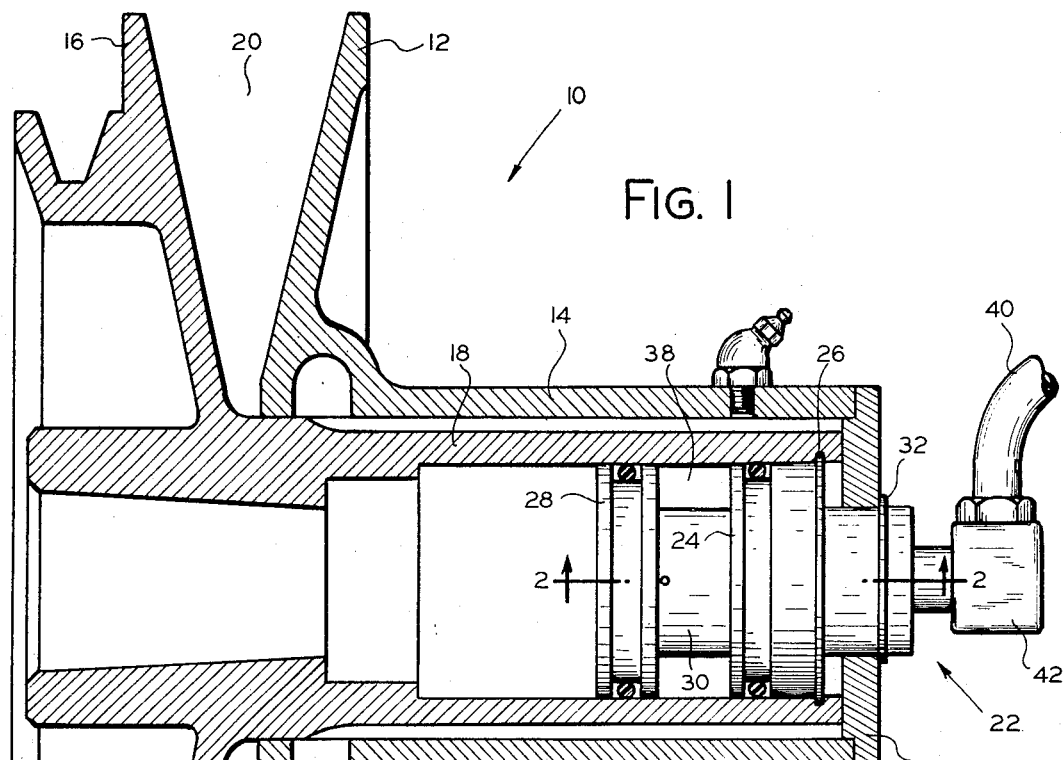
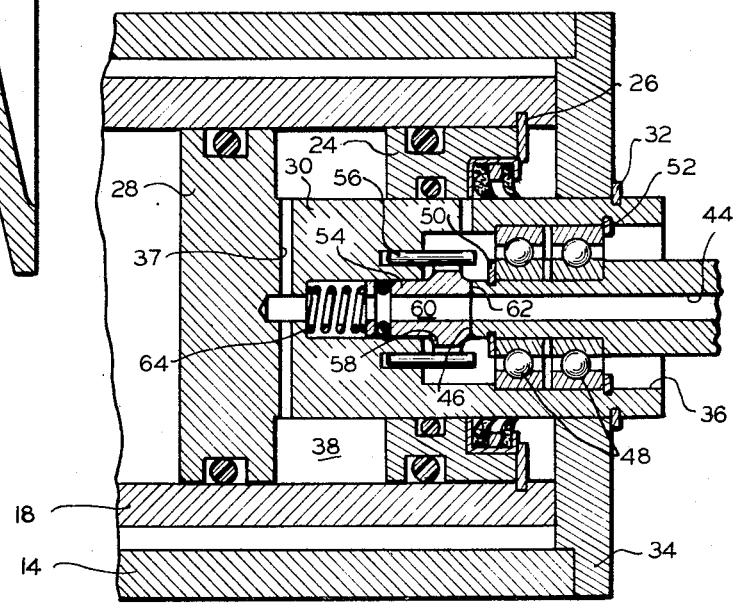

VARIABLE SPEED PISTON-SWIVEL COMBINATION

BACKGROUND OF THE INVENTION

The field of art to which this invention pertains includes fluid couplings.

It is known to use swivel joints with variable sheaves, but previously the swivel joints were connected to such sheaves in exposed positions, and consequently were rather susceptible to damage. Thus, an object of my invention is to provide a sheave and swivel joint combination in which the swivel joint is effectively protected from damage. My improved construction additionally has the advantages that it is less expensive, uses fewer parts and occupies less space than previous constructions.

SUMMARY OF THE INVENTION

In carrying out my invention in a preferred embodiment thereof, I provide a pair of sheave members, each having a tubular portion. One of the tubular portions is slidably telescoped in the other tubular portion and has a piston slidably disposed therein. The piston defines with the one tubular portion a chamber and is connected to the other tubular portion by means of a piston rod. The piston rod includes a bore therein and a fluid passage which connects the bore with the chamber. Disposed substantially entirely within the bore is a swivel joint which includes a member connected to the piston rod for relative rotation and held from substantial axial movement by a bearing assembly.

The above and other objects, features and advantages of my invention will be more readily understood by persons skilled in the art when the detailed description is taken in conjunction with the drawing.

BRIEF DESCRIPTION OF THE DRAWING

FIG. 1 of the drawing is a longitudinal section of a variable sheave and swivel joint combination, and FIG. 2 is a sectional view taken along line 2—2 in FIG. 1.

DESCRIPTION OF THE PREFERRED EMBODIMENT

Referring to the drawing, the reference numeral 10 denotes generally a variable sheave which includes a first sheave member 12 with an integral tubular portion 14 and a second sheave member 16 which an integral tubular portion 18 which is slidably telescoped within tubular portion 14.

Sheave members 12 and 16 define an annular space 20 therebetween which is generally V-shaped in cross-section and which is adapted to receive a V-belt (not shown). The spacing between sheave members 12 and 16 is variable by means of pressurized fluid supplied through a swivel joint 22 as will be explained in more detail shortly. By varying the spacing between sheave members 12 and 16 the radius on which the V-belt is trained about sheave 10 can be varied.

Variable sheave 10 includes a cap 24 which is sealably received in and connected to tubular portion 18 by means of a snap ring 26. Slidably and sealably disposed in tubular portion 18 is a piston 28 which has integral therewith a piston rod 30 that extends outwardly through cap 24. Piston rod 30 is connected to tubular portion 14 of sheave member 12 by means of a snap ring 32 which engages an end plate 34 fastened to tubular portion 14 by any suitable means.

Extending longitudinally of piston rod 30 is a bore 36 having an enlarged diameter portion. A reduced diameter portion of bore 36 is in fluid communication via a plurality of fluid passages 37 with a chamber 38 defined by tubular portion 18, cap 24 and piston 28.

By supplying pressurized fluid to chamber 38 sheave members 12 and 16 are biased toward each other so that the width of annular space 20 is reduced. FIG. 1 is shown with sheave members 16 and 12 biased as close together as possible since the end of tubular portion 18 abuts end plate 34, the V-belt being correspondingly biased in this position to its maximum pitch diameter.

Swivel joint 22 is supplied with pressurized fluid through a conduit 40 and in turn supplies pressurized fluid to chamber 38 via fluid passages 44, 60, 37. Swivel joint 22 is disposed substantially entirely within the enlarged diameter portion of bore 36 and includes a first member 42 having a portion exteriorily of bore 36 to which fluid conduit 40 is connected and which includes a longitudinally extending fluid passage 44 therein and a sealing surface 46, as shown. Member 42 is connected to piston rod 30 for relative rotation therewith by a pair of bearings 48. Bearings 48 are held in place and member 42 is held from any substantial axial movement by means of a pair of snap rings 50 and 52 which engage grooves in member 42 and piston rod 30, respectively. Swivel joint 22 also includes a member 54 axially slidable in the reduced diameter portion of the bore 36 and which is connected to piston rod 30 for conjoint rotation therewith by means of a pair of pins 56 which engage slots 58 in member 54, thereby permitting member 54 to move axially relative to piston rod 30, as shown.

Member 54 includes a fluid passage 60 which extends longitudinally therethrough and communicates with fluid passages 44 and 37 and a sealing surface 62 which is biased into abutment with sealing surface 46 by means of a spring 64 which is disposed in the reduced diameter portion of bore 36 adjacent the end of member 54 which is opposite sealing surface 62.

At this point it will be apparent that pressurized fluid can be supplied to chamber 38 from conduit 40 through fluid passages 44 and 60 of swivel joint 22 and hence to bore 36 and from there through fluid passages 37. The relative rotation of members 42 and 54 of swivel joint 22 is provided for by sealing surfaces 46 and 62. Furthermore, it will now be apparent that the structure which I have just described offers substantial protection to swivel joint 22 and has the advantage of requiring fewer parts than the prior art construction, as well as being less expensive to manufacture.

While only a single preferred embodiment of my invention has been described in detail, it will be understood that such description is intended to be illustrative only and that my invention is subject to various modifications and changes which nonetheless would fall within the scope and spirit of my invention. Consequently, the limits of my invention should be determined from the following appended claims.

I claim:

1. A variable sheave and swivel joint comprising a first sheave member, said first sheave member including a first tubular portion, a second sheave member, said second sheave member including a second tubular portion slidably telescoped in said first tubular portion, a cap connected to said second tubular portion, a piston defining with said cap and second tubular portion a chamber, a piston rod which slidably extends through said cap and is connected to said piston and said first tubular portion, a bore in said piston rod, said bore having an axially extending enlarged diameter portion disposed substantially entirely within said first tubular portion, a fluid passage connecting said bore with said chamber, and a swivel joint disposed substantially entirely within said enlarged diameter portion for supplying fluid to said chamber via said fluid passage.

2. The combination as set forth in claim 1 wherein said swivel joint includes a first member disposed in said enlarged diameter portion and connected to said piston rod for relative rotation therewith, said first member including a first sealing surface and a second fluid passage, a second member slidably disposed in said enlarged diameter portion and connected to said piston rod for conjoint rotation, said second member including a second sealing surface located in abutting relation to said first sealing surface and a third fluid passage which communicates with said first and second fluid passages, and means disposed in said bore for biasing said second sealing surface into sealing relation with said first sealing surface.

3. The combination as set forth in claim 2 wherein said first member is connected to said piston rod for relative rotation therewith and held from substantial axial movement by bearing means.

4. In a variable sheave comprising a pair of sheave members defining a V-shaped angular space therebetween for receiving a V-belt, each sheave member having a tubular portion extending axially thereof, the tubular portion of one sheave member being telescopically and slidably received in the tubular portion of the other sheave member, a piston reciprocally mounted in the tubular portion of the one sheave member and operatively connected to the tubular portion of the other sheave member for common axial movement therewith, means co-operating with the piston and tubular portion to define a chamber, fluid pressure means connected to said chamber for supplying fluid pressure thereto such that one of said sheave members is caused to move in a direction axially relative to the other for changing the pitch diameter of said V-belt, the improvement comprising a hollow cylindrical structure having an open end connected between said piston and tubular portion of said other sheave member and coaxially disposed in the tubular portion of said one sheave member, a nonrotative first member projecting axially into the open end of said cylindrical structure and having an annular sealing surface on the inner end thereof, bearing means within said cylindrical structure supporting said member and permitting relative rotation of said cylindrical structure, a rotative second member slidably mounted in said cylindrical structure for conjoint rotation therewith having an annular sealing surface yieldably engaging the annular sealing surface on said first member, said fluid passage means including a first passage in said first member, a second passage in said second member connected to said first passage and a third fluid passage in said cylindrical structure connected between said second passage and said chamber.

5. The improvement according to claim 4 wherein said cylindrical structure includes a bore of reduced diameter slidably receiving a portion of said second member, spring means received in said bore, and pin means slidably supporting said second member axially within said cylindrical structure for conjoint rotation therewith.

6. The improvement as set forth in claim 4 wherein the open end of said cylindrical structure projects beyond the end of the tubular portion of said other sheave member and comprising, a closure member secured on the end of said latter mentioned tubular portion and through which the cylindrical structure portion projects, and means preventing relative axial movement of said tubular portion and cylindrical member when fluid pressure is introduced in said chamber.

* * * * *